(12) United States Patent
Bacalso et al.

(10) Patent No.: US 11,297,199 B2
(45) Date of Patent: Apr. 5, 2022

(54) IMAGE PROCESSING APPARATUS THAT GENERATES COVER PAGE FROM SOURCE IMAGE

(71) Applicant: KYOCERA Document Solutions Inc., Osaka (JP)

(72) Inventors: Gestoni Bacalso, Osaka (JP); Lianney Sy, Osaka (JP); Junalyn Cutar, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 17/214,951

(22) Filed: Mar. 29, 2021

(65) Prior Publication Data

US 2021/0314460 A1 Oct. 7, 2021

(30) Foreign Application Priority Data

Apr. 7, 2020 (JP) .............................. JP2020-069282

(51) Int. Cl.
*H04N 1/387* (2006.01)
*H04N 1/32* (2006.01)
*G06V 30/416* (2022.01)
*G06V 30/10* (2022.01)

(52) U.S. Cl.
CPC ....... *H04N 1/32112* (2013.01); *G06V 30/416* (2022.01); *H04N 1/3871* (2013.01); *G06V 30/10* (2022.01); *H04N 2201/0093* (2013.01); *H04N 2201/0094* (2013.01)

(58) Field of Classification Search
CPC ............. H04N 1/32112; H04N 1/3871; H04N 2201/0093; H04N 2201/0094; G06K 9/00469; G06K 2209/01
See application file for complete search history.

(56) References Cited

U.S. PATENT DOCUMENTS

| | | | |
|---|---|---|---|
| 2003/0030846 A1* | 2/2003 | Mori ................... | H04N 1/00408 358/400 |
| 2004/0145761 A1* | 7/2004 | Kuwahara .......... | H04N 1/32133 358/1.11 |
| 2005/0200906 A1* | 9/2005 | Tanimoto ........... | H04N 1/00222 358/400 |
| 2007/0064952 A1* | 3/2007 | Takada ................... | H04N 1/324 380/286 |
| 2007/0201101 A1* | 8/2007 | Corona ................ | H04N 1/0035 358/468 |

(Continued)

FOREIGN PATENT DOCUMENTS

JP 2007-082258 A 3/2007

*Primary Examiner* — Moustapha Diaby
(74) *Attorney, Agent, or Firm* — IP Business Solutions, LLC

(57) ABSTRACT

An image processing apparatus includes an image reading device, a communication device, and a control device. The control device acts as a controller. The controller recognizes at least one text region in the source image, extracts a predetermined keyword from the at least one text region, generates a cover page by pasting a character string of the text region from which the keyword has been extracted, on a pasting position on a predetermined cover page template, associated with the keyword extracted, and causes the communication device to transmit the generated cover page together with the source image, to the external terminal device.

5 Claims, 16 Drawing Sheets

(56) References Cited

U.S. PATENT DOCUMENTS

2012/0243040 A1\* 9/2012 Matsumoto ........ H04N 1/32117
                                                                                358/1.15
2014/0233072 A1\* 8/2014 Kawabata .......... H04N 1/32112
                                                                                358/407

\* cited by examiner

Fig.3
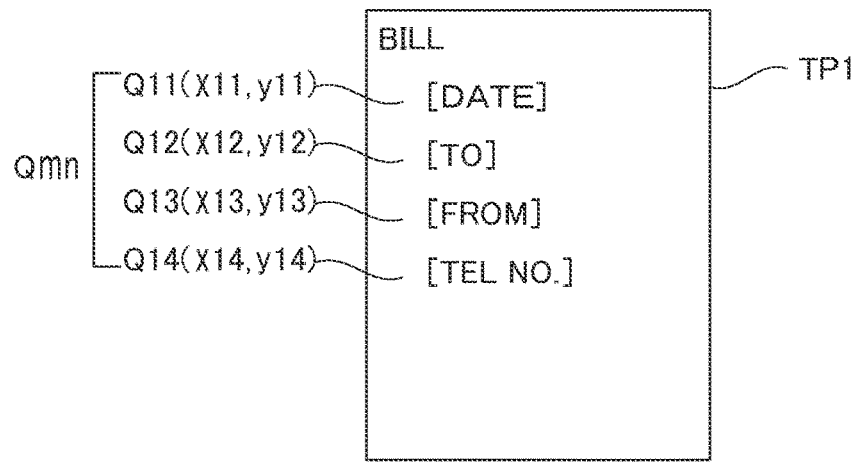
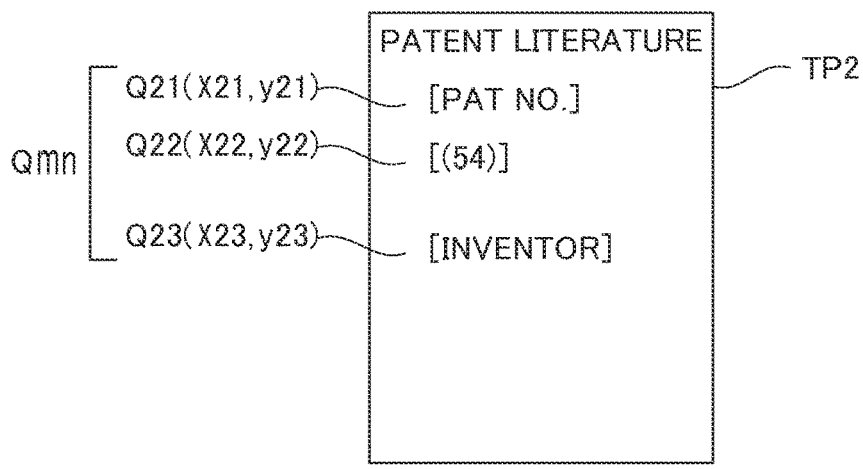
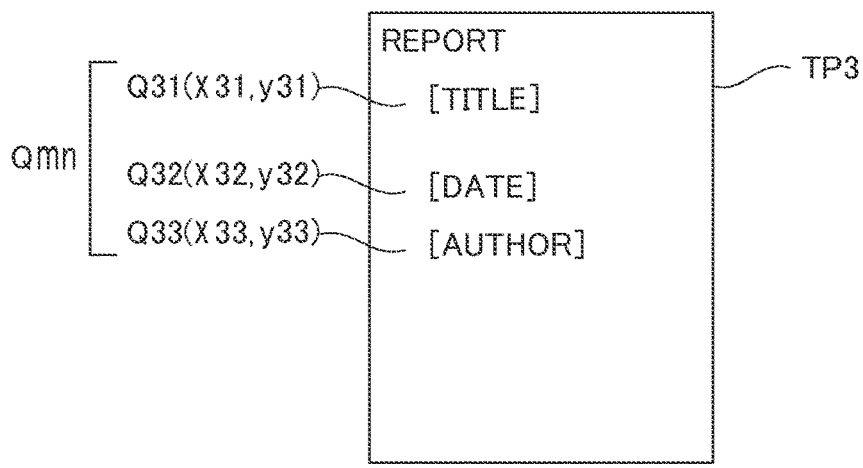

Fig.4

| COVER PAGE TEMPLATE | KEYWORD GROUP |
|---|---|
| TP1 (BILL) | KG1 (DATE、TO、FROM、TEL NO.) |
| TP2 (PATENT LITERATURE) | KG2 (PAT NO.、(54)、INVENTOR) |
| TP3 (REPORT) | KG3 (TITLE、DATE、AUTHOR) |
| | |

| COVER PAGE TEMPLATE | KEYWORD | PASTING POSITION |
|---|---|---|
| TP1<br>(BILL) | DATE<br>TO<br>FROM<br>TEL NO. | Q11(X11,y11)<br>Q12(X12,y12)<br>Q13(X13,y13)<br>Q14(X14,y14) |
| TP2<br>(PATENT LITERATURE) | PAT NO.<br>(54)<br>INVENTOR | Q21(X21,y21)<br>Q22(X22,y22)<br>Q23(X23,y23) |
| TP3<br>(REPORT) | TITLE<br>DATE<br>AUTHOR | Q31(X31,y31)<br>Q32(X32,y32)<br>Q33(X33,y33) |
|  |  |  |

| COVER PAGE TEMPLATE | KEYWORD | NUMBER EXTRACTED | NUMBER OF COUNTS |
|---|---|---|---|
| TP1 (BILL) | DATE<br>TO<br>FROM<br>TEL NO. | 1<br>0<br>0<br>0 | 1 |
| TP2 (PATENT LITERATURE) | PAT NO.<br>(54)<br>INVENTOR | 1<br>1<br>1 | 3 |
| TP3 (REPORT) | TITLE<br>DATE<br>AUTHOR | 0<br>1<br>0 | 1 |

Fig.16

| COVER PAGE TEMPLATE | KEYWORD | SYNONYMOUS KEYWORD | SYNONYMOUS ICON |
|---|---|---|---|
| TP1 (BILL) | DATE<br>TO<br>FROM<br>TEL NO. | —<br>RECEIVER ...<br>SENDER ...<br>TELNUM ... | |
| TP2 (PATENT LITERATURE) | PAT NO.<br>(54)<br>INVENTOR | PATENTNO. ...<br>(FIFTY FOUR) ...<br>CREATOR ... | IC |
| TP3 (REPORT) | TITLE<br>DATE<br>AUTHOR | SUBJECT ...<br>—<br>WRITER | |

PD

IMAGE PROCESSING APPARATUS THAT GENERATES COVER PAGE FROM SOURCE IMAGE

INCORPORATION BY REFERENCE

This application claims priority to Japanese Patent Application No. 2020-069282 filed on Apr. 7, 2020, the entire contents of which are incorporated by reference herein.

BACKGROUND

The present disclosure relates to an image processing apparatus that reads a source document and transmits the source image to an external terminal device, and in particular to a technique to generate a cover page on the basis of the source image, and transmit the cover page together with the source image.

The image processing apparatus can be exemplified by a facsimile machine. The facsimile machine reads a source document with an image reading device, and transmits the source image that has been read to another facsimile machine on the receiving end. When an image is to be transmitted, a cover page is often attached to the image. However, it is troublesome to make out the cover page, and therefore it is desirable that the cover page is automatically made out. Accordingly, for example, a technique including installing in advance a template of the cover page in the facsimile machine has been developed. In this case, the user can input a character string in input fields in the cover page, thereby making out the cover page, and transmit the main content, with such cover page attached.

SUMMARY

The disclosure proposes further improvement of the foregoing technique.

In an aspect, the disclosure provides an image processing apparatus including an image reading device, a communication device, and a control device. The image reading device reads a source document, and generates a source image. The communication device makes communication with an external terminal device. The control device includes a processor, and acts as a controller when the processor executes a control program. The controller recognizes at least one text region in the source image, extracts a predetermined keyword from the at least one text region, generates a cover page by pasting a character string of the text region from which the keyword has been extracted, on a pasting position on a predetermined cover page template, associated with the keyword extracted, and causes the communication device to transmit the generated cover page together with the source image, to the external terminal device.

BRIEF DESCRIPTION OF THE DRAWINGS

FIG. 3 is a schematic drawing showing examples of three types of cover page templates;

FIG. 4 is a template table showing each of the cover page templates and the corresponding keyword group;

FIG. 5 is a pasting position table showing a plurality of keywords in the keyword group corresponding to each of the cover page templates, and the respectively corresponding pasting positions in the cover page template;

FIG. 13 is a table showing the number of counts of extracted keywords, counted with respect to each of the keyword groups;

FIG. 16 is a schematic drawing showing another example of the template table.

DETAILED DESCRIPTION

Hereafter, an embodiment of the disclosure will be described, with reference to the drawings.

Figure 1:
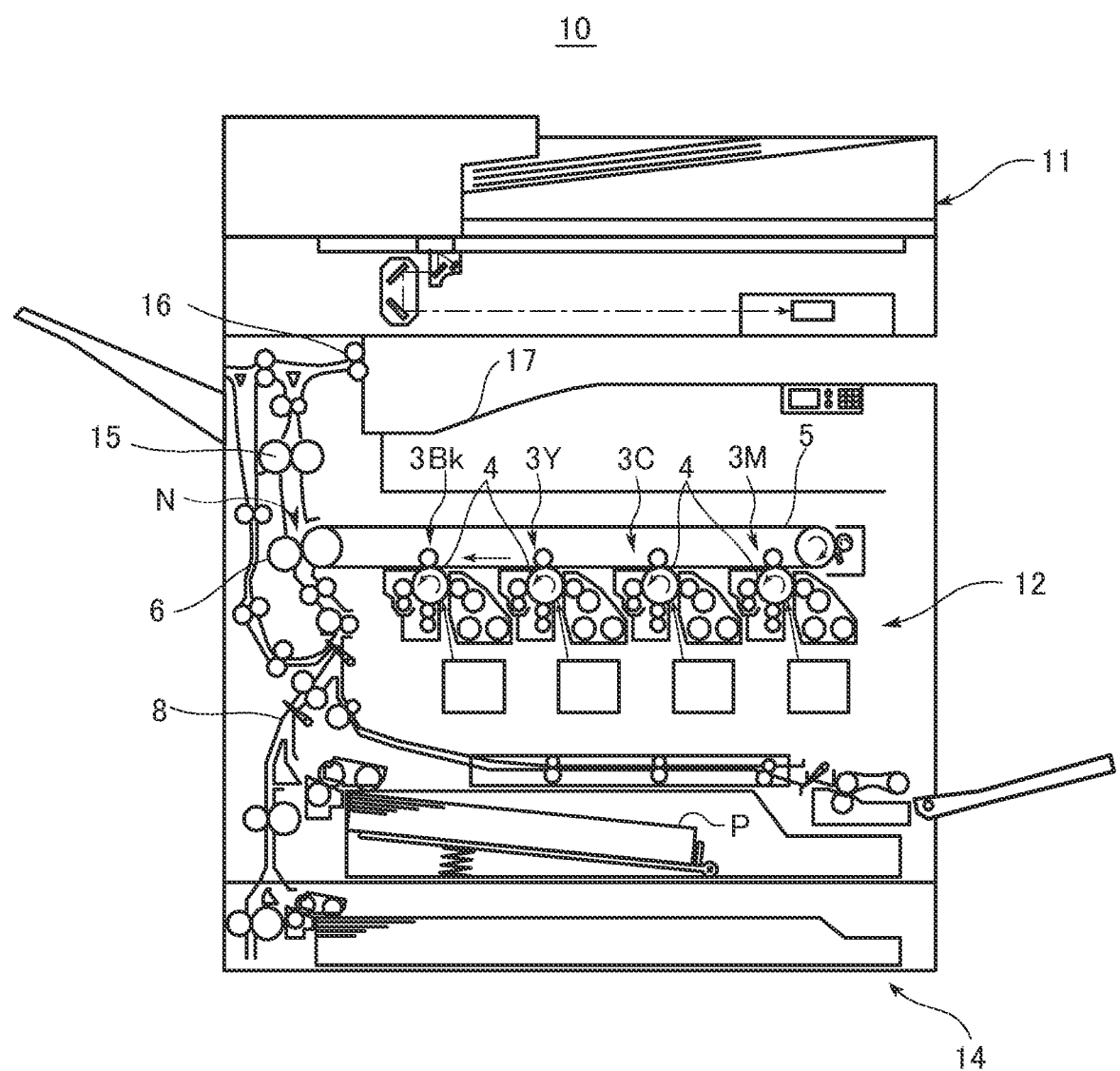
FIG. 1 is a cross-sectional view of an image forming apparatus incorporated with an image processing apparatus according to the disclosure.

FIG. 1 is a cross-sectional view of an image forming apparatus incorporated with an image processing apparatus according to the disclosure. The image forming apparatus 10 is a multifunction peripheral (MFP) having a plurality of functions including, for example, a copying function, a printing function, and a facsimile function. The image forming apparatus 10 includes an image reading device 11 and an image forming device 12.

The image reading device 11 includes an image sensor that optically reads the image of a source document. The image reading device 11 converts the analog output from the image sensor into a digital signal, and generates image data representing the image of the source document (hereinafter, simply "source image").

The image forming device 12 forms an image represented by the image data on a recording sheet. The image forming device 12 includes an image forming unit 3M for magenta, an image forming unit 3C for cyan, an image forming unit 3Y for yellow, and an image forming unit 3Bk for black. In each of the image forming units 3M, 3C, 3Y, and 3Bk, the surface of a photoconductor drum 4 is uniformly charged, and an electrostatic latent image is formed on the surface of the photoconductor drum 4 by exposure. Then the electrostatic latent image on the surface of the photoconductor drum 4 is developed into a toner image, and the toner image on the photoconductor drum 4 is transferred to an intermediate transfer roller 5, as a primary transfer process. Thus, the color toner image is formed on the intermediate transfer roller 5. The color toner image is transferred to a recording sheet P, transported along a transport route 8 from a paper feeding device 14, at a nip region N defined between the intermediate transfer roller 5 and a secondary transfer roller 6.

Thereafter, the recording sheet P is press-heated in a fixing device 15, so that the toner image on the recording sheet P is fixed by thermal compression, and then the recording sheet P is discharged to an output tray 17 through a discharge roller 16.

Figure 2:
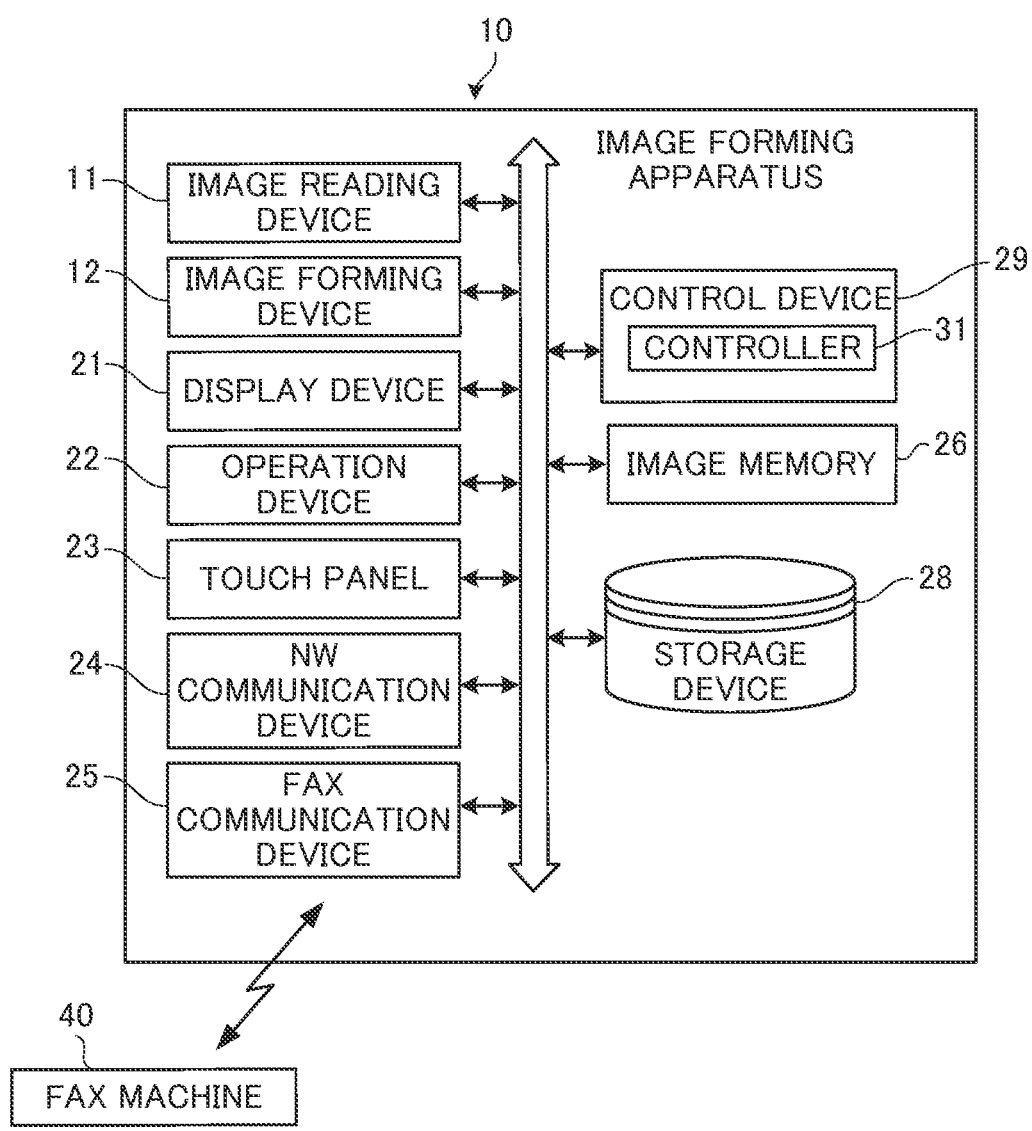
FIG. 2 is a functional block diagram showing an essential internal configuration of the image forming apparatus.

Hereunder, a configuration related to the control of the image forming apparatus 10 will be described. FIG. 2 is a block diagram showing an essential internal configuration of the image forming apparatus 10 according to this embodiment. As shown in FIG. 2, the image forming apparatus 10 according to this embodiment includes the image reading device 11, the image forming device 12, a display device 21, an operation device 22, a touch panel 23, a network (NW) communication device 24, a facsimile (FAX) communication device 25, an image memory 26, a storage device 28, and a control device 29. The mentioned components are configured to transmit and receive data or signals to and from each other, via a bus.

The display device 21 is, for example, constituted of a liquid crystal display (LCD) or an organic light-emitting diode (OLED) display. The operation device 22 includes physical keys such as a tenkey, an enter key, and a start key.

A touch panel 23 is overlaid on the screen of the display device 21. The touch panel 23 is based on a resistive film or electrostatic capacitance. The touch panel 23 detects a contact (touch) of the user's finger, along with the touched position, and outputs a detection signal indicating the coordinate of the touched position, to a controller 31 of the control device 29 to be subsequently described. The touch panel 23 enables the user to perform an operation on a graphical user interface (GUI) displayed on the screen of the display device 21.

The NW communication device 24 is a communication interface including a communication module such as a local area network (LAN) chip. The NW communication device 24 is connected to other terminal devices via a wired LAN or a wireless LAN, to transmit and receive data to and from the other terminal devices.

The FAX communication device 25 makes communication via a network with external terminal devices, such as other image forming apparatuses or facsimile machines 40, to transmit and receive image data representing an image.

The storage device 28 includes a large-capacity solid state drive (SSD) or a hard disk drive (HDD), and contains various application programs and various types of data.

The control device 29 includes a processor, a random-access memory (RAM), a read-only memory (ROM), and so forth. The processor is, for example, a central processing unit (CPU), an application specific integrated circuit (ASIC), or a micro processing unit (MPU). The control device 29 acts as the controller 31, when the processor executes a control program stored in the storage device 28.

The controller 31 executes overall control of the image forming apparatus 10. The control device 29 is connected to the image reading device 11, the image forming device 12, the display device 21, the operation device 22, the touch panel 23, the NW communication device 24, the FAX communication device 25, the image memory 26, and the storage device 28. The controller 31 controls the operation of the mentioned components, and transmits and receives data and signals to and from each of those components.

The controller 31 serves as a processing device that executes various operations necessary for the image forming to be performed by the image forming apparatus 10. Further, the controller 31 receives operational instructions inputted by the user, in the form of a detection signal outputted from the touch panel 23, or through a press of a physical key of the operation device 22. In addition, the controller 31 is configured to control the display operation of the display device 21, and the communication performed by the NW communication device 24 and the FAX communication device 25.

In the image forming apparatus 10 configured as above, the controller 31 receives, for example, setting instructions related to a copy job from the user, such as designation of color or monochrome, the number of copies to print, and so forth, through the touch panel 23 or the operation device 22, according to the user's operation performed on the GUI displayed on the screen of the display device 21, or on the operation device 22. Thereafter, when the user sets a source document on the image reading device 11, and presses the start key on the operation device 22, so that the controller 31 receives the instruction to execute the copy job through the operation device 22, the controller 31 causes, according to the copy job setting instruction received as above, the image reading device 11 to read the source document and temporarily store the source image in the image memory 26, and inputs the source image to the image forming device 12, to cause the image forming device 12 to form the source image on the recording sheet.

In addition, for example, the controller 31 receives setting instructions related to a facsimile job from the user, such as destination information including the telephone number of the facsimile machine 40 on the receiving end, the image resolution, and so forth, through the touch panel 23 or the operation device 22, according to the user's operation performed on the GUI displayed on the screen of the display device 21, or on the operation device 22. Thereafter, when the user sets a source document on the image reading device 11, and presses the start key on the operation device 22, so that the controller 31 receives the instruction to execute the facsimile job through the operation device 22, the controller 31 causes, according to the facsimile job setting instruction received as above, the image reading device 11 to read the source document and temporarily store the source image in the image memory 26, and causes the FAX communication device 25 to transmit the source image to the facsimile machine 40 on the receiving end.

As described above, the image forming apparatus 10 is configured to execute the copy job and the facsimile job.

Regarding the facsimile job, a cover page is often attached to the image to be transmitted. However, it is troublesome to make out the cover page, and therefore it is desirable to automatize the work to make out the cover page.

In the image forming apparatus 10 according to this embodiment, accordingly, the controller 31 recognizes at least one text region in the source image generated by the image reading device 11, extracts a predetermined keyword from the at least one text region, and selects a keyword group including the extracted keyword, out of a predetermined plurality of keyword groups. Then the controller 31 selects a cover page template associated with the selected keyword group, out of a predetermined plurality of types of cover page templates, pastes the character string of the text region from which the keyword has been extracted, on a pasting position on the selected cover page template, associated with the extracted keyword, thereby making out the cover page, and causes the FAX communication device 25 to transmit the source image and the cover page, to the external terminal device.

It will be assumed here that, for example, three types of cover page templates TP1, TP2, and TP3 are prepared in advance, as shown in FIG. 3. The cover page template TP1 is used as the cover page of a bill, the cover page template TP2 is used as the cover page of a patent literature, and the cover page template TP3 is used as the cover page of a report.

FIG. 4 shows a template table TD indicating the cover page templates TP1, TP2, and TP3, and the respectively corresponding keyword groups KG1, KG2, and KG3. The template table TD is stored in advance in the storage device 28.

As shown in FIG. 4, the keyword group KG1 is associated with the cover page template TP1, the keyword group KG2 is associated with the cover page template TP2, and the keyword group KG3 is associated with the cover page template TP3. In each of the keyword groups KG1, KG2, and KG3, a plurality of keywords are allocated in advance.

In addition, as shown in FIG. 3, a plurality of pasting positions Qmn are arranged, with respect to each of the cover page templates TP1, TP2, and TP3. To the plurality of pasting positions Qmn on each of the cover page templates, the plurality of keywords, included in the keyword group corresponding to the cover page template, are respectively associated.

FIG. 5 shows a pasting position table PD, indicating the plurality of pasting positions Qmn and the respectively corresponding keywords in the keyword group, with respect to each of the cover page templates TP1, TP2, and TP3. The pasting position table PD is stored in advance in the storage device 28.

When the controller 31 extracts, for example, the keywords "pat no.", "(54)", and "inventor" from the text region in the source image, the controller 31 looks up the template table TD in the storage device 28, to thereby identify the keyword group KG2 including the extracted keywords "pat no.", "(54)", and "inventor", and also the cover page template TP2 associated with the keyword group KG2. Then the controller 31 looks up the pasting position table PD in the storage device 28, to thereby acquire the pasting positions Q21, Q22, and Q23 in the cover page template TP2, respectively associated with the extracted keywords "pat no.", "(54)", and "inventor", and pastes the character string of the text region from which one of the keywords "pat no.", "(54)", and "inventor" has been extracted, on the corresponding one of the pasting positions Q21, Q22, and Q23, thus making out the image of the cover page. Such an arrangement alleviates the burden of having to make out the cover page, which would otherwise be imposed on the user.

Figure 6:
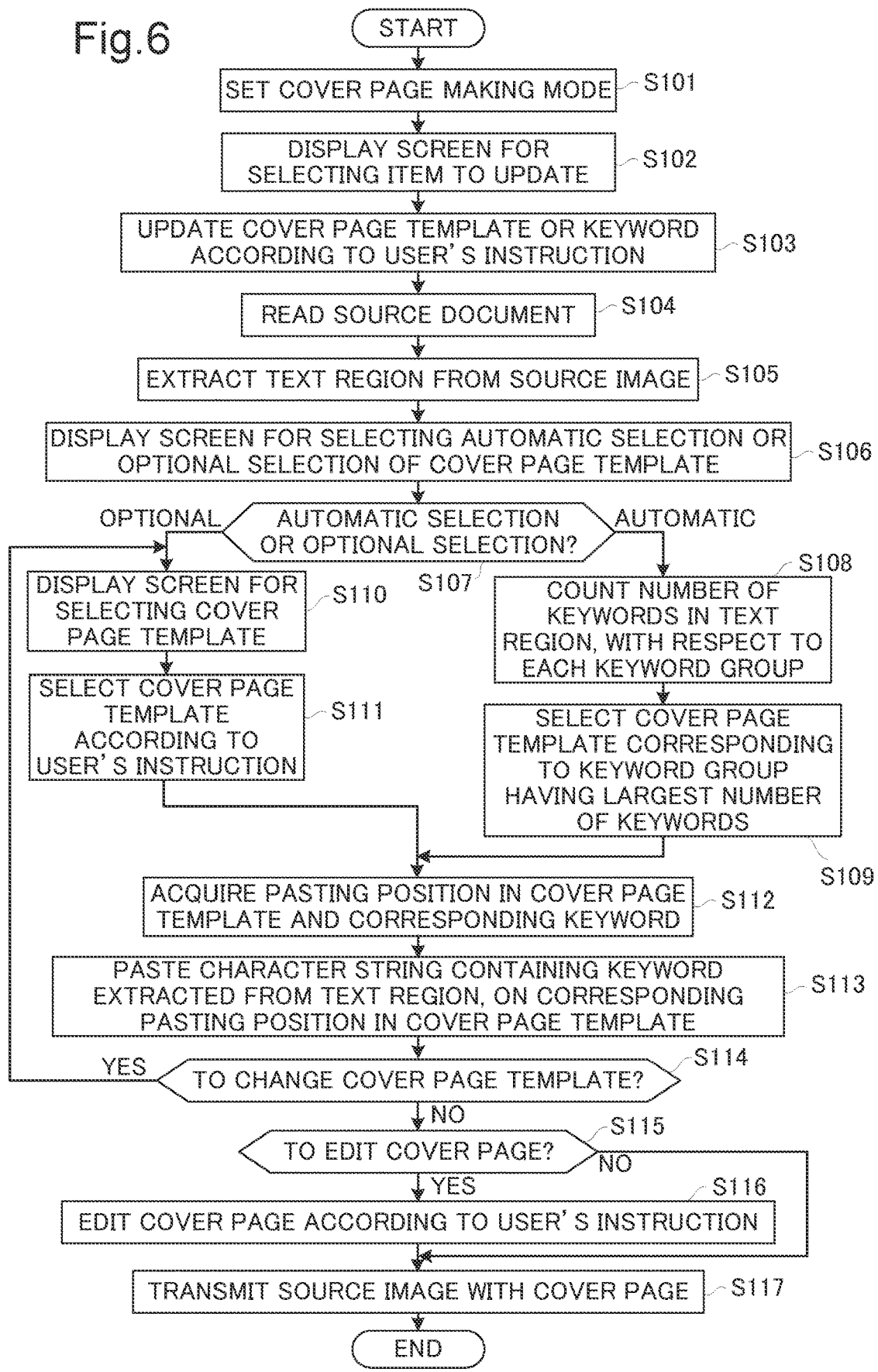
FIG. 6 is a flowchart showing a process of creating a cover page, on the basis of a source image.

Referring now to a flowchart shown in FIG. 6, the operation of making out the cover page to be used in a facsimile job, from the source image generated by the image reading device 11, will be described in detail.

Figure 7:
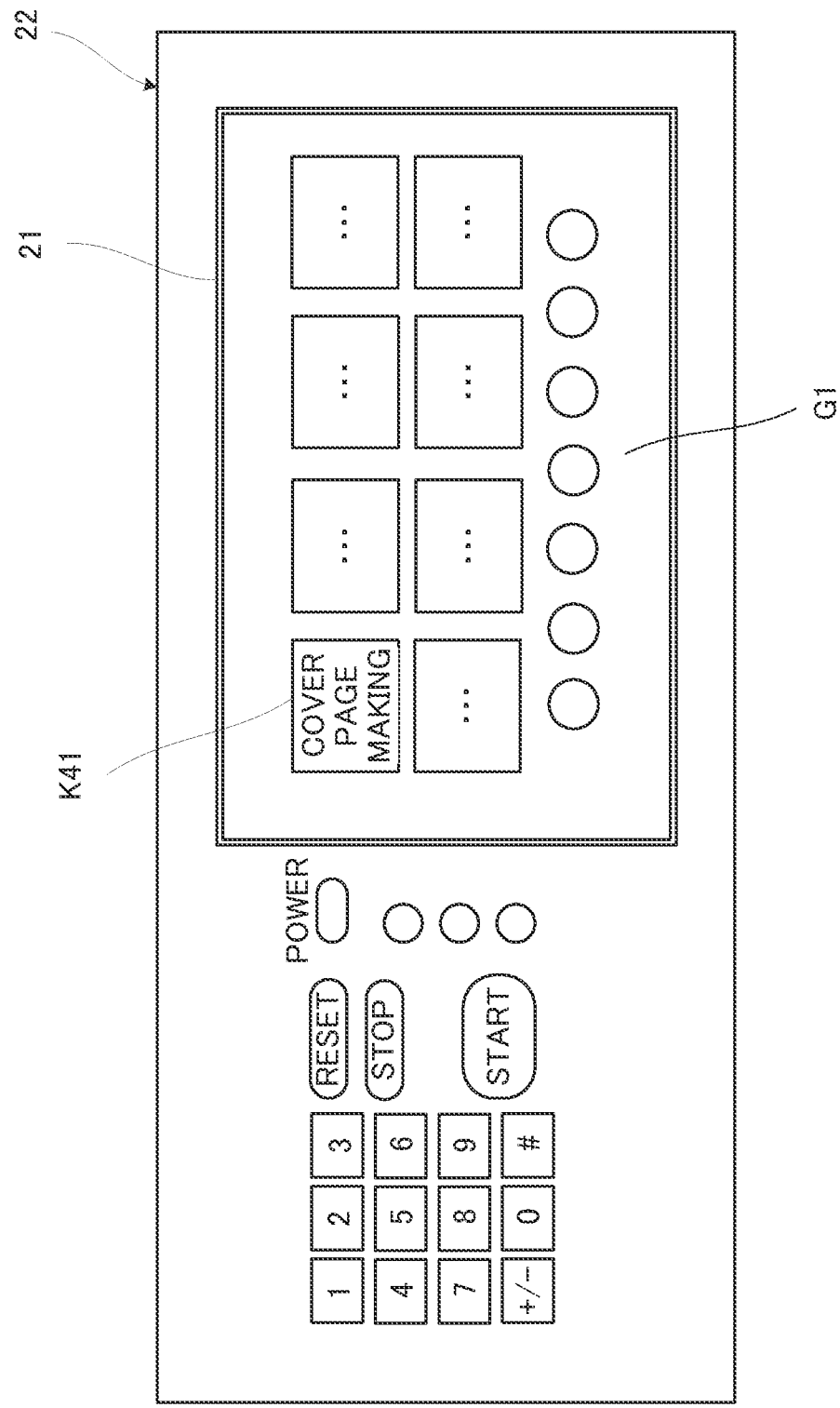
FIG. 7 is a schematic drawing showing an example of a function key for instructing the creation of the cover page.

It is assumed here that a screen including a function key K41, for inputting the instruction to make out the cover page, is displayed on the display device 21 as shown in FIG. 7, under the control of the controller 31. When the user touches the function key K41, the controller 31 receives the instruction to set a cover page making mode through the touch panel 23, and sets the operation mode of the image forming apparatus 10 to the cover page making mode (step S101).

Figure 8:
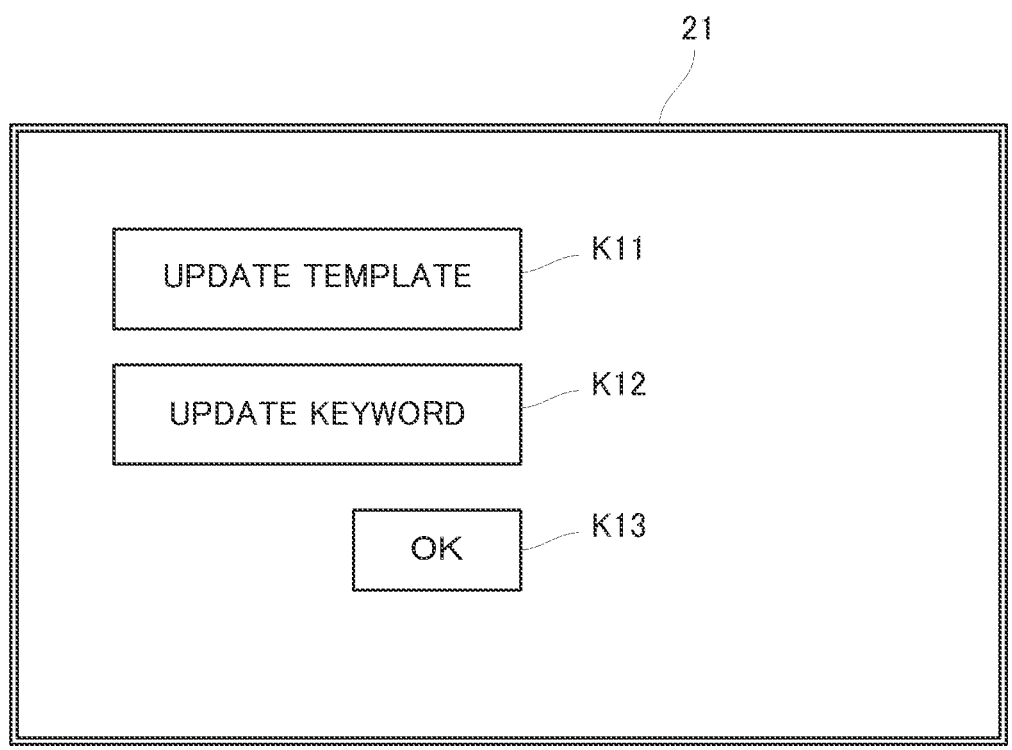
FIG. 8 is a schematic drawing showing an example of a screen for selecting an item to be updated.
Figure 9:
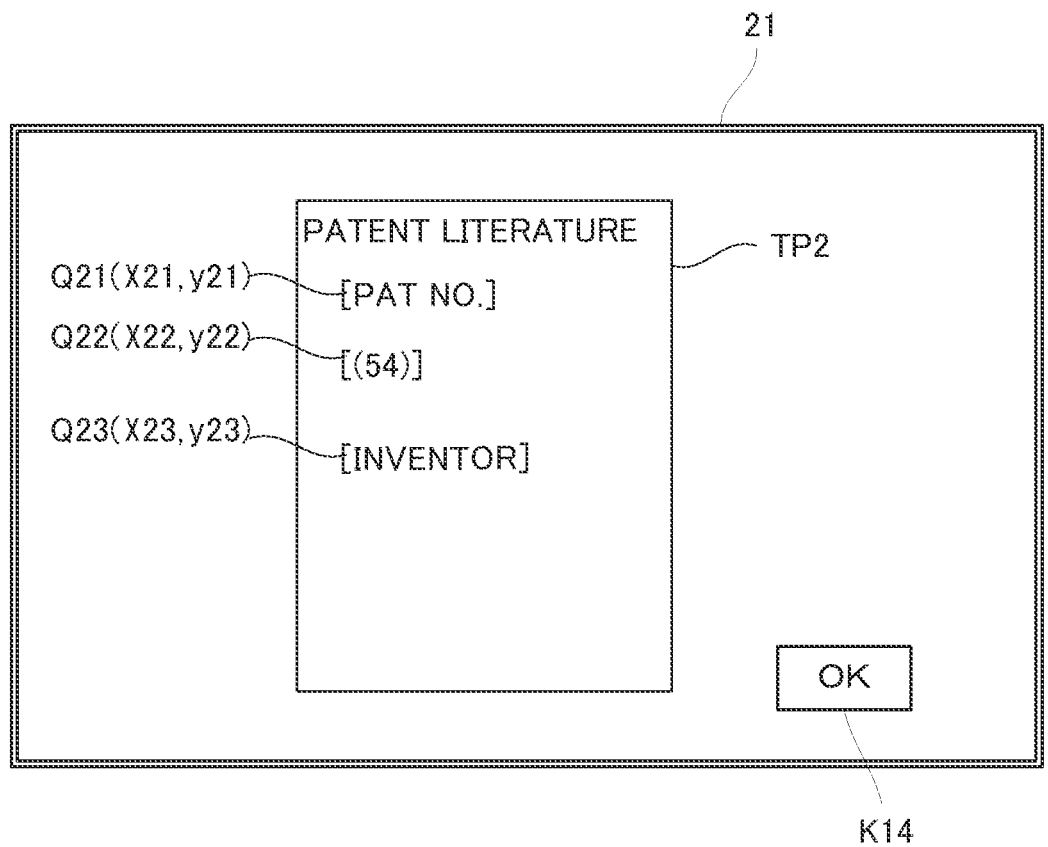
FIG. 9 is a schematic drawing showing an example of a screen for updating the cover page template.

Upon setting the cover page making mode, the controller 31 causes the display device 21 to display a screen showing a function key K11 for inputting the instruction to update the cover page template, a function key K12 for inputting the instruction to update the keyword, and an OK key K13, as shown in FIG. 8 (step S102). When the user touches the function key K11, the controller 31 receives the instruction to update the cover page template through the touch panel 23, and causes the display device 21 to display a screen including a list of the cover page templates TP1, TP2, and TP3 from the pasting position table PD stored in the storage device 28. Upon receipt of the instruction to select one of the cover page templates out of the list, inputted by the user through the touch panel 23, the controller 31 looks up the pasting position table PD, and causes the display device 21 to display a screen including the selected cover page template. For example, as shown in FIG. 9, the controller 31 causes the display device 21 to display a screen including the cover page template TP2 and an OK key K14.

The controller 31 receives an instruction designating the pasting position Qmn in the cover page template TP2, or an instruction to designate, change, add, or delete the keyword associated with the pasting position Qmn, according to a touch operation by the user on the cover page template TP2 being displayed on the screen of the display device 21, or on a soft keyboard (an example of GUI) temporarily displayed on the screen of the display device 21, or an operation by the user through the operation device 22. FIG. 9 illustrates a case where the positions indicated by square brackets [ ] in the cover page template TP2 are designated as the pasting positions Qmn, and the character string written inside each of the square brackets is designated as the keyword associated with the corresponding pasting position Qmn.

When the user touches the OK key K14, the controller 31 receives the instruction to fix the mentioned designation, through the touch panel 23. According to the fixing instruction, the controller 31 updates the pasting position table PD by overwriting the pasting position Qmn and the associated keyword thus far registered, with the newly designated pasting position Qmn in the cover page template TP2, and the newly designated, changed, added, or deleted keyword, and also updates the template table TD by overwriting the keyword thus far registered, with the newly designated, changed, added, or deleted keyword. Thus, the pasting position Qmn in the cover page template, and the keyword associated with the pasting position Qmn are updated (step S103).

Figure 10:
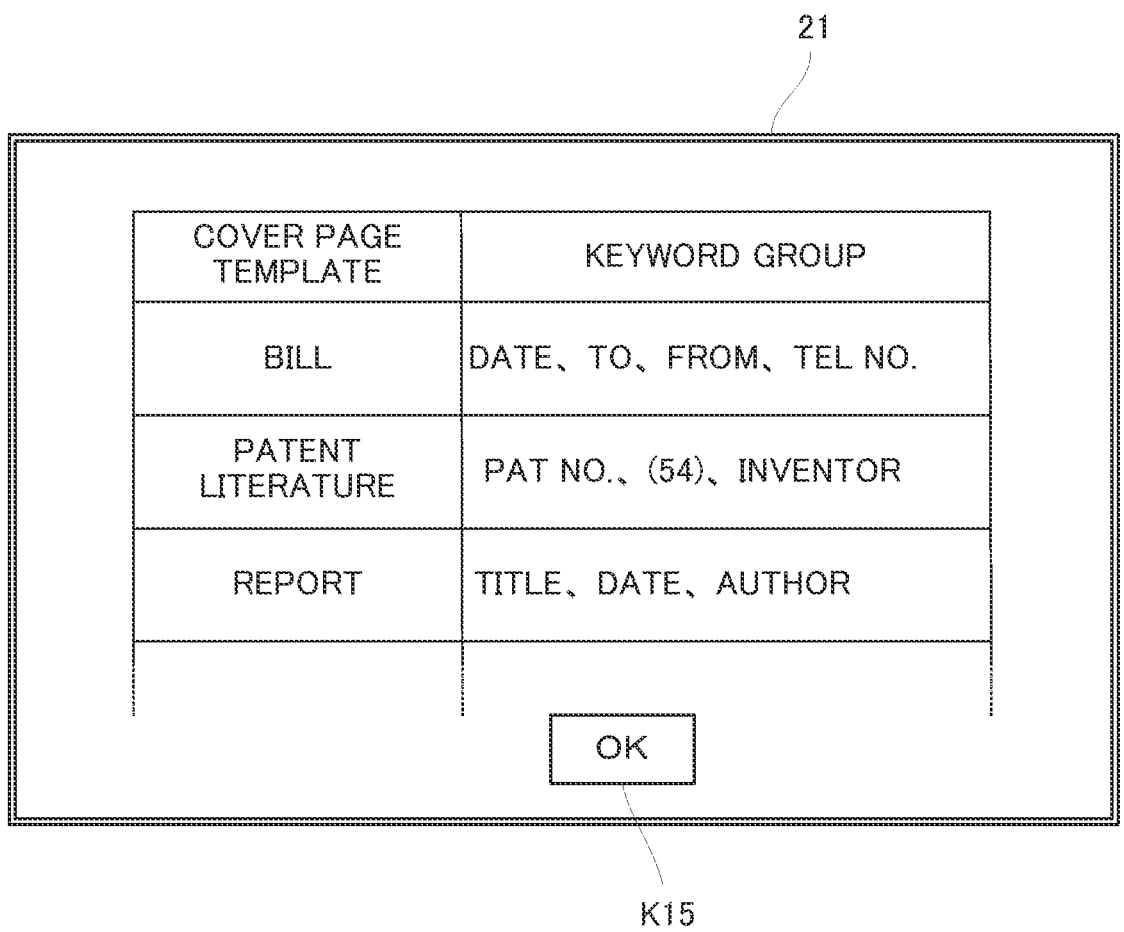
FIG. 10 is a schematic drawing showing an example of a screen for updating the keyword.

When the user touches the function key K12 while the screen shown in FIG. 8 is displayed on the display device 21, the controller 31 receives the instruction to update the keyword through the touch panel 23, and causes the display device 21 to display a screen including a list indicating the cover page templates TP1, TP2, and TP3 and the respectively corresponding keyword groups KG1, KG2, and KG3, registered in the template table TD stored in the storage device 28. For example, as shown in FIG. 10, the controller 31 causes the display device 21 to display a screen including the list showing the cover page templates TP1, TP2, and TP3 and the respectively corresponding keyword groups KG1, KG2, and KG3, and an OK key K15.

The controller 31 then receives the instruction to designate, change, add, or delete the keyword, according to a touch operation by the user on the screen of the display device 21 or on a soft keyboard temporarily displayed on the screen of the display device 21, or an operation by the user through the operation device 22.

When the user touches the OK key K15, the controller 31 receives the instruction to fix the designated, changed, added, or deleted keyword, through the touch panel 23. According to the fixing instruction, the controller 31 updates the template table TD by overwriting the keyword thus far registered, with the newly designated, changed, added, or deleted keyword. Thus, the keyword in the keyword group is updated (step S103).

The controller 31 thus updates the pasting position table PD and the template table TD as above. Then the operation proceeds to step S104. In the case where the user touches the OK key K13 while the screen shown in FIG. 8 is displayed on the display device 21, without updating the pasting position table PD and the template table TD, the controller 31 receives a cancel instruction through the touch panel 23, and proceeds to step S104.

The controller 31 then receives the setting information related to the facsimile job, through the touch panel 23 or the operation device 22, according to a touch operation by the user on the GUI displayed on the screen of the display device 21, or an operation by the user through the operation device 22. Further, when the user touches the start key on the operation device 22, the controller 31 receives the instruction to execute the facsimile job through the operation device 22, and causes the image reading device 11 to read the source document according to the setting information related to the facsimile job received as above (step S104). The source image is temporarily stored in the image memory 26.

The controller 31 then recognizes the text region, the image region, and the blank region in the source image in the image memory 26, using the known optical character recognition (OCR) function and a region distinction technique (step S105).

Figure 11:
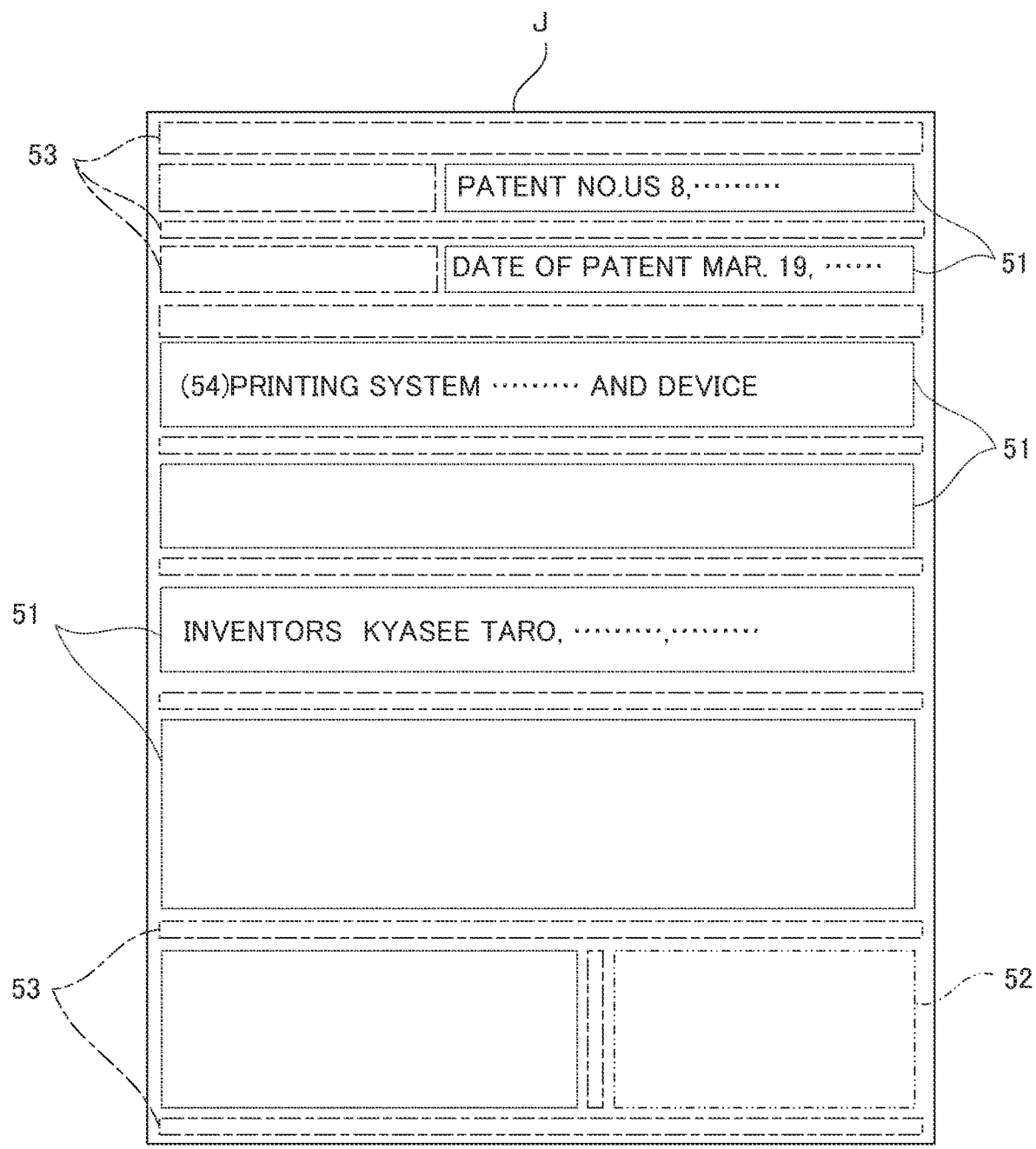
FIG. 11 is a schematic drawing showing the image of a patent literature (source document) read by an image reading device.

For example, the controller 31 causes the image reading device 11 to read a patent literature J shown in FIG. 11, as the source document, and stores the image of the patent literature J in the image memory 26, as the source image. The patent literature J includes a plurality of text regions 51, an image region 52, and a plurality of blank regions 53. The controller 31 recognizes the text regions 51, the image region 52, and the blank regions 53, with the OCR function and the region distinction technique.

Figure 12:
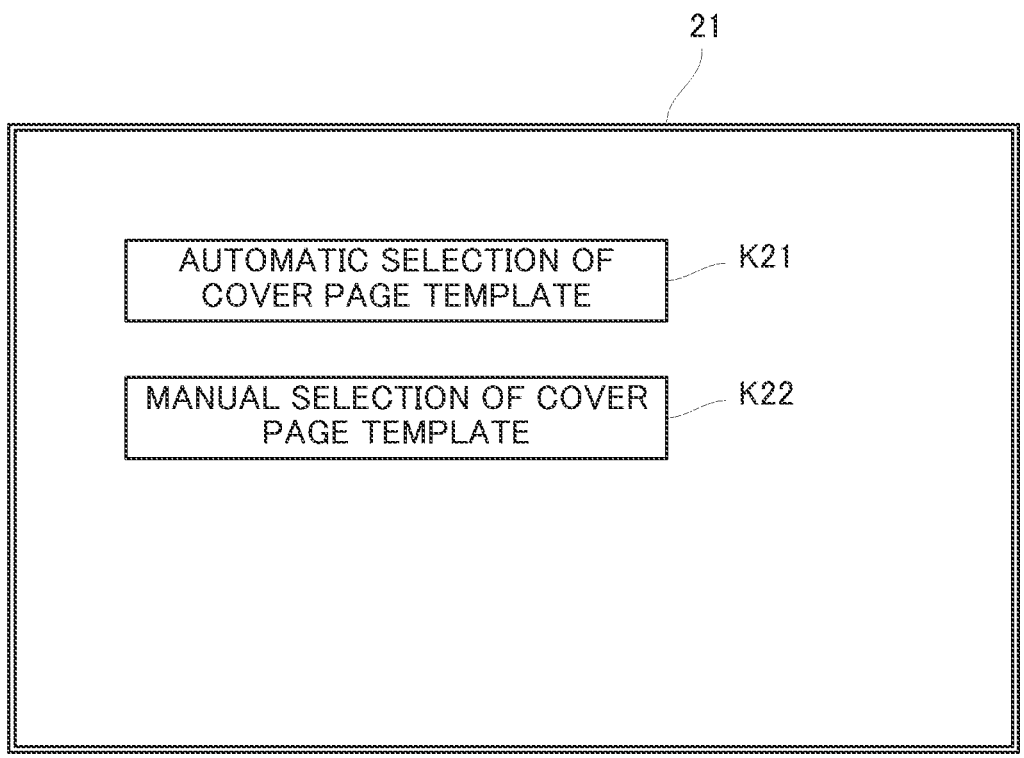
FIG. 12 is a schematic drawing showing an example of a setup screen for selecting automatic selection or optional selection of the cover page template.

Then the controller 31 causes the display device 21 to display a selection screen for designating either of automatic selection and optional selection with respect to the cover page template, as shown in FIG. 12 (step S106). The selection screen includes a function key K21 for designating the automatic selection, and a function key K22 for designating the manual selection.

When the user touches the function key K21, for example, the controller 31 receives the instruction to extract the keyword, through the touch panel 23 ("Automatic" at step S107). The controller 31 compares the texts included in all the text regions recognized at step S105, with the keywords in the keyword groups KG1, KG2, and KG3 registered in the template table TD, and sequentially extracts the text that accords with the keyword (hereinafter, simply "keyword"), from the text region.

Each time the controller 31 extracts the keyword, the controller 31 records to which of the keyword groups KG1, KG2, and KG3 the extracted keyword belongs, and adds 1 to the number of counts of the keyword group to which the extracted keyword belongs (step S108). Here, it is preferable that the controller 31 counts up the number only once, though the same keyword is repeatedly extracted. Thus, the number of counts, indicating the number of extracted keywords included in the keyword group, is acquired with respect to each of the keyword groups KG1, KG2, and KG3 in the template table TD. It is assumed here that, for example, the number of counts of the keyword group KG1 corresponding to the cover page template TP1 is "1", the number of counts of the keyword group KG2 corresponding to the cover page template TP2 is "3", and the number of counts of the keyword group KG3 corresponding to the cover page template TP3 is "1", as indicated in a table M shown in FIG. 13.

The controller 31 selects the cover page template corresponding to the keyword group that has gained the largest number of counts (step S109). In this example, the controller 31 selects the cover page template TP2 corresponding to the keyword group KG2, which has gained the number of counts "3". Thereafter, the operation proceeds to step S112.

Figure 14:
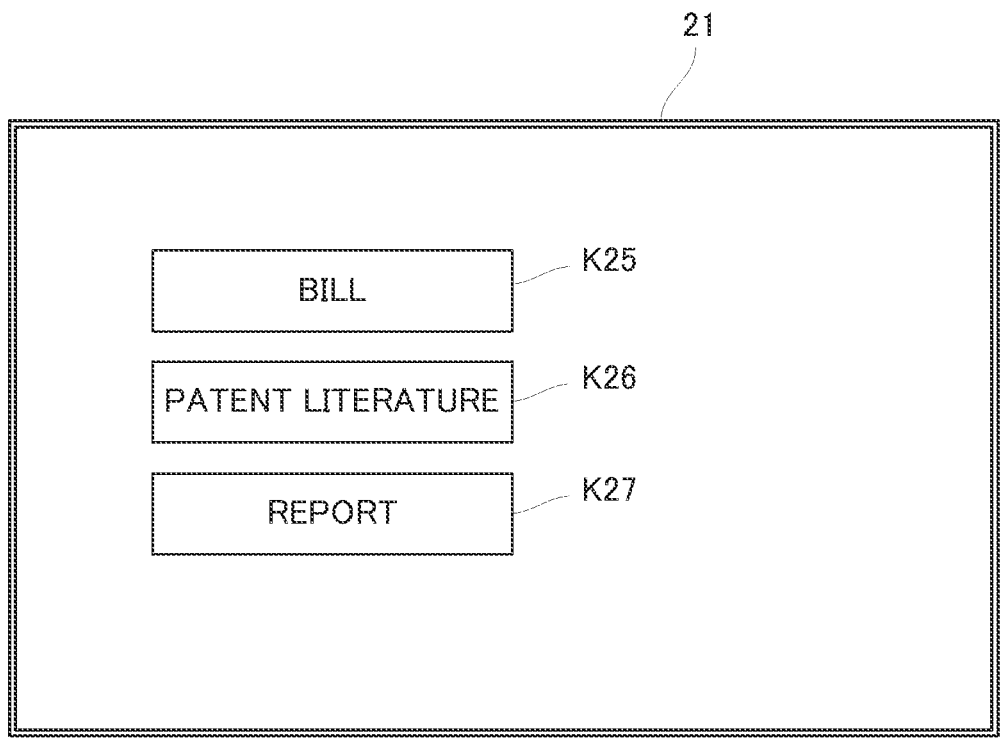
FIG. 14 is a schematic drawing showing an example of a selection screen for selecting the cover page template.

In contrast, when the user touches the function key K22 at step S107, the controller 31 receives the instruction to manually select the template through the touch panel 23 ("Optional" at step S107), and causes the display device 21 to display a selection screen for selecting one of the cover page templates TP1, TP2, and TP3, as shown in FIG. 14 (step S110). The selection screen includes function keys K25, K26, and K27 respectively corresponding to the cover page templates TP1, TP2, and TP3. The controller 31 receives, through the touch panel 23, the instruction to select the cover page template corresponding to the function key displayed at the position touched by the user (step S111). For example, when the user touches the function key K26 for selecting the cover page template TP2, the controller 31 receives the instruction to select the cover page template TP2, through the touch panel 23. Thereafter, the operation proceeds to step S112.

Figure 15:
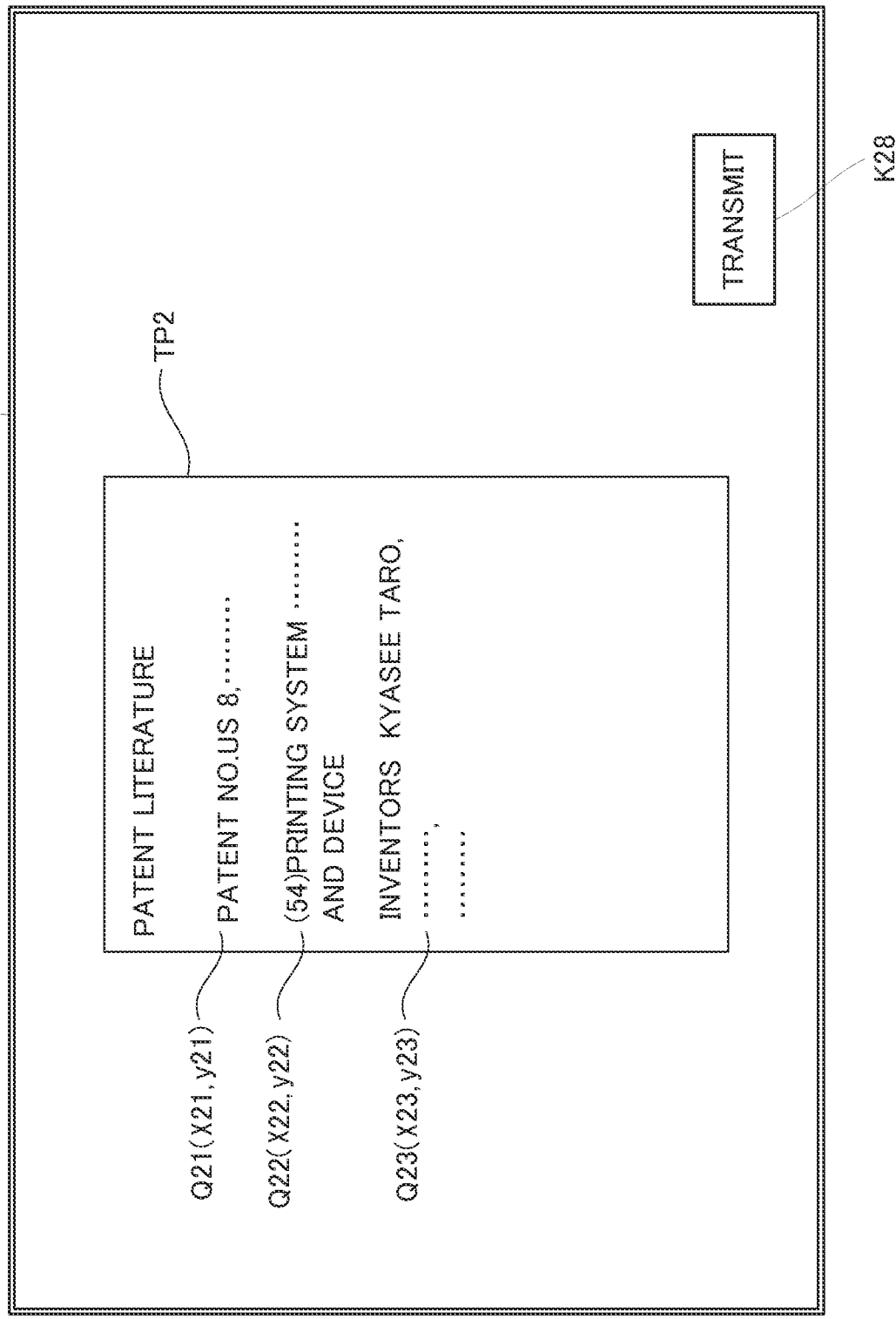
FIG. 15 is a schematic drawing showing an example of a transmission screen for inputting a facsimile transmission instruction.

At step S112, the controller 31 looks up the pasting position table PD in the storage device 28, and acquires the pasting positions in the cover page template selected at step S109 or step S111, and the keywords respectively associated with the pasting positions (step S112). In this example, the controller 31 acquires the pasting positions Q21, Q22, and Q23 in the cover page template TP2, and the keywords "pat no.", "(54)", and "inventor", respectively associated with the pasting positions Q21, Q22, and Q23. The controller 31 extracts, with respect to each of the acquired keywords, namely with respect to each of "pat no.", "(54)", and "inventor", the text region 51 including the keyword, out of the text regions 51 recognized at step S105, and pastes the character string extracted from the text region 51 on the pasting position in the cover page template TP2 corresponding to the keyword, thereby making out the cover page (step S113). For example, as shown in FIG. 15, the controller 31 pastes the character string "U.S. Pat. No. 8,_____" of the text region 51, from which the keyword "pat no." associated with the pasting position Q21 in the cover page template TP2 has been extracted, on the pasting position Q21, pastes the character string "(54) PRINTING SYSTEM . . . AND DEVICE" of the text region 51, from which the keyword "(54)" associated with the pasting position Q22 has been extracted, on the pasting position Q22, and pastes the character string "Inventors Kyasee Taro, . . . , . . . " of the text region 51, from which the keyword "inventor" associated with the pasting position Q23 has been extracted, on the pasting position Q23, thus making out the cover page. The controller 31 causes the display device 21 to display a screen showing the preview of the cover page thus made out.

The controller 31 causes the display device 21 to further display, when displaying the preview screen, a message urging the user to input an instruction whether to change the cover page made out as above, in other words whether to change the cover page template and make out the cover page again. When the controller 31 receives the instruction to change the cover page template inputted by the user, through the operation device 22 or the touch panel 23 (YES at step S114), the operation returns to step S110. In this case, the controller 31 causes the display device 21 to display the selection screen for selecting one of the cover page templates TP1, TP2, and TP3, as shown in FIG. 14 (step S110). Thereafter, the controller 31 repeats the operation from step S111.

In the case where the instruction to change the cover page template is not received (NO at step S114), the controller 31 causes the display device 21 to display a screen including a message urging the user to input an instruction whether to edit the cover page made out at step S113 and displayed on the screen as the preview image.

When the instruction to edit the cover page is received through the operation device 22 or the touch panel 23 (YES at step S115), the controller 31 receives the instruction to change the pasting position, or the character string pasted on the pasting position, through the operation device 22 or the touch panel 23, according to a touch operation by the user on the cover page displayed on the screen of the display device 21, or on a soft keyboard temporarily displayed on the screen of the display device 21, or an operation by the user through the operation device 22, and changes the pasting position, or the character string pasted on the pasting position, according to the instruction received (step S116). Thereafter, the operation proceeds to step S117.

In the case where the instruction to edit the cover page is not received (NO at step S115), the controller 31 skips the operation of step S116, and proceeds to step S117.

At step S117, the controller 31 causes the display device 21 to display a transmission screen as shown in FIG. 15. Upon receipt of a facsimile transmission instruction through the touch panel 23, according to a touch operation by the user on a transmission key K28 on the transmission screen, the controller 31 attaches the image representing the cover page made out at step S113 or edited at step S116 to the first page of the source image, and transmits the attached image representing the cover page, and the source image generated by the image reading device 11 at step S105, to a designated destination through the FAX communication device 25, according to the setting information related to the facsimile job specified at step S104 (step S117).

Now, in the case of the foregoing background art, the user has to take the trouble to input the character string in the input field in the cover page, which is far from the automation of the cover page making operation.

According to this embodiment, in contrast, the controller 31 recognizes at least one text region in the source image generated by the image reading device 11, selects one of the plurality of keyword groups on the basis of the keyword extracted from the at least one text region, selects one of the plurality of cover page templates associated with the selected keyword group, pastes the character string of the text region from which the keyword has been extracted, on the pasting position in the selected cover page template, thereby making out the cover page, and causes the FAX communication device 25 to transmit the source image and the cover page to the external terminal device. Such an arrangement exempts the user from the operation to make out the cover page, and to transmit the source image. Consequently, the cover page to be attached to the source image can be made out without the need for the user to perform the work when transmitting the source image, and the cover page and the source image can be transmitted together.

Although the controller 31 makes out the cover page utilizing a keyword having a specific meaning in the foregoing embodiment, the controller 31 may make out the cover page utilizing a plurality of keywords or an icon having the same meaning. For example, as shown in FIG. 16, the controller 31 may register, in the template table TD stored in the storage device 28, "receiver" in association with the keyword "to" for the cover page template TP1, because of being synonymous therewith, "sender" in association with the keyword "from", because of being synonymous therewith, and "telnum" and an icon IC in association with the keyword "tel no.", because of being synonymous therewith. In this case, the controller 31 adds one to the number of counts for the keyword group KG1 corresponding to the cover page template TP1, each time one of (i) the keyword "to" or "receiver", (ii) the keyword "from" or "sender", (iii) the keyword "tel no." or "telnum", and (iv) the icon IC is extracted from the text region in the source image, at step S108. Then the controller 31 extracts the text region including the keyword or the icon, the mentioned synonymous keywords and the icon inclusive, out of the text regions 51 extracted at step S105, and pastes the character string extracted from the text region 51 on the pasting position in the cover page template TP1 associated with the keyword or the icon, thus making out the cover page.

Although the image processing apparatus according to the disclosure is incorporated in the image forming apparatus, in the foregoing embodiment, the image processing apparatus according to the disclosure may be incorporated in a facsimile machine.

In addition, the disclosure may be applied, not only to the facsimile communication, but also to the case where the source image read by the image reading device is transmitted to another terminal device, such as a personal computer, via the network.

The configurations and processings described in the foregoing embodiments with reference to FIG. 1 to FIG. 16 are merely exemplary, and in no way intended to limit the disclosure to those configurations and processings.

While the present disclosure has been described in detail with reference to the embodiments thereof, it would be apparent to those skilled in the art the various changes and modifications may be made therein within the scope defined by the appended claims.

What is claimed is:

1. An image processing apparatus comprising:
    an image reading device that reads a source document, and generates a source image;
    a communication device that makes communication with an external terminal device; and
    a control device including a processor, and configured to act as a controller when the processor executes a control program, the controller being configured to:
    recognize at least one text region in the source image;
    extract a predetermined keyword from the at least one text region;
    generate a cover page by pasting a character string of the text region from which the keyword has been extracted, on a pasting position on a predetermined cover page template, associated with the keyword extracted; and
    cause the communication device to transmit the generated cover page together with the source image, to the external terminal device.

2. The image processing apparatus according to claim 1, wherein the controller selects the pasting position associated with the extracted keyword, out of the pasting positions in the cover page template respectively associated with a plurality of keywords, and generates the cover page by pasting the character string of the text region from which the keyword has been extracted, on the pasting position selected.

3. The image processing apparatus according to claim 1, further comprising a storage device containing a plurality of types of cover page templates, and a plurality of keyword groups each including a plurality of keywords different from each other, the cover page templates and the keyword groups being respectively associated with each other, wherein the controller selects the keyword group including the extracted keyword, out of the plurality of keyword groups, and selects the cover page template associated with the selected keyword group, out of the plurality of types of cover page templates, as the predetermined cover page template.

4. The image processing apparatus according to claim 3, wherein the controller extracts at least one keyword from the at least one text region, selects the keyword group including a largest number of the extracted keywords out of the plurality of keyword groups, and selects the cover page template associated with the selected keyword group, out of the plurality of types of cover page templates, as the predetermined cover page template.

5. The image processing apparatus according to claim 1, wherein the controller also extracts a keyword or a predetermined icon synonymous with the predetermined keyword, from the at least one text region, and generates the cover page by pasting the character string of the text region from which the keyword has been extracted, on the pasting position in the predetermined cover page template, associated with the extracted synonymous keyword or the icon.

\* \* \* \* \*